United States Patent
Uehara et al.

(10) Patent No.: US 8,173,751 B2
(45) Date of Patent: May 8, 2012

(54) DEFOAMERS FOR TOP COAT PAINTS FOR MOTOR VEHICLES

(75) Inventors: Takao Uehara, Kawasaki (JP); Jun Yamazaki, Koshigaya (JP); Kiyomasa Ohira, Soka (JP); Shigehiro Kawahito, Soka (JP)

(73) Assignee: Kusumoto Chemicals, Ltd., Tokyo (JP)

( * ) Notice: Subject to any disclaimer, the term of this patent is extended or adjusted under 35 U.S.C. 154(b) by 807 days.

(21) Appl. No.: 11/559,256

(22) Filed: Nov. 13, 2006

(65) Prior Publication Data
US 2007/0073023 A1    Mar. 29, 2007

Related U.S. Application Data

(63) Continuation of application No. 10/823,719, filed on Apr. 14, 2004, now abandoned.

(51) Int. Cl.
C08F 271/00    (2006.01)
C08F 118/02    (2006.01)
C08L 31/00     (2006.01)
C08L 33/06     (2006.01)

(52) U.S. Cl. ......... 525/293; 524/556; 524/560; 526/319

(58) Field of Classification Search .................. 523/160, 523/161; 524/589, 556, 560; 526/319; 528/301, 528/312, 319; 525/293
See application file for complete search history.

(56) References Cited

U.S. PATENT DOCUMENTS

| 4,219,632 A | * | 8/1980 | Simms ........................ 526/227 |
| 5,270,392 A | * | 12/1993 | Okude et al. .................. 525/207 |
| 5,576,406 A | * | 11/1996 | Yamamura et al. ........... 526/320 |

* cited by examiner

*Primary Examiner* — Michael M Bernshteyn
(74) *Attorney, Agent, or Firm* — Hahn & Voight PLLC; Roger C. Hahn

(57) ABSTRACT

The invention provides novel defoamers which are useful as defoamers for top coat paints for motor vehicles. When the defoamers are incorporated with paints which do not use melamine resins as the curing agent, they can impart defoaming property to the paints without inviting turbidity in the painted films caused by infiltration of water. Hence the defoamers are particularly useful when used for baking finish type clear top coat paints for motor vehicles. The defoamer is characterized by comprising a copolymer of 2-50% by weight of (A) a polymerizable monomer capable of forming a copolymer having isocyanate groups which can react with a binder resin in thermosetting type paint or (b) a polymerizable monomer capable of forming a copolymer having the groups which produce isocyanate groups reactable with a binder resin in thermosetting type paint during the baking step of the same paint, and 98-50% by weight of (C) a monomer or polymer conventionally used for defoamers.

9 Claims, No Drawings

DEFOAMERS FOR TOP COAT PAINTS FOR MOTOR VEHICLES

This application is a continuation of Ser. No. 10/823,719 filed on Apr. 14, 2004, which is a Continuation-In-Part application of Ser. No. 10/727,666 filed on Dec. 5, 2003, which is a continuation of Ser. No. 09/925,451 filed on Aug. 10, 2001, which in turn claims priority from Japanese Patent Application No. 2000-255720 filed on Aug. 25, 2000.

Technical Field to Which the Invention Belongs

This invention relates to defoamers for baking finish top coat paints for motor vehicles. The defoamers of the present invention can impart, when added to baking finish top coat paints, defoaming property to the paint-coated surfaces. The defoamers of the invention furthermore have a function to prevent whitening phenomenon of painted surfaces induced by the defoamers added and, therefore, are particularly useful as defoamers for baking finish clear top coat paints for motor vehicles, for which transparency is an important requirement. Whitening phenomenon of painted surfaces herein referred to signifies a phenomenon that dry painted film, after being immersed in warm water, is whitened due to particles of a defoamer added to the paint. Hereinafter the property or ability to prevent this phenomenon is referred to as anti-whitening property. This anti-whitening property is evaluated by visual examination of extent of whitening caused after immersion of dry painted films in warm water.

Prior Art

Top coat paints for motor vehicles are generally blended with defoamers for removing foams which are entrained during the paint application. As one of starting materials for defoamers, polymers of reactive compounds are used. Whereas, when the polymer-derived defoamers are blended with paints, they remain in the cured clear paint film in the form of particles.

On the other hand, as binders which are used as a component of top coat paints for motor vehicles, generally a hydroxyl-containing polymer and a melamine resin curing agent are used in combination. However, cured painted films obtained with the use of melamine resin as curing agent are generally inferior in acid resistance. Hence such painted films are notably susceptible to deterioration by acid precipitation which has been a problem emerged recently. That is, the films have poor weatherability. To cope with acid precipitation, there introduced recently are new curing type top coat paints for motor vehicles, which do not use melamine resin as the curing agent. For example, glycidyl-containing acrylic resin/acid anhydride-curing type clear paints as disclosed in European Patent Publication No. 0353734A2, U.S. Pat. No. 5,270,392 and JP-Hei 6 (1994)-228503A can be named. However, a number of such new type top coat paints for motor vehicles exhibit a phenomenon, due to said particles of polymeric defoamers, that their dry painted films after being immersed in warm water are whitened.

The Problem to be Solved by the Invention

Generally a defoamer is blended in paint before the latter's application to an object, to prevent such phenomena that the foams which were entrained during the paint application remain on the painted surface to degrade appearance of the painted film or that pinholes caused by such foams impair the film's protection performance of the painted object.

Whereas, when conventional polymeric defoamers are blended in new curing type paints using no melamine resin as curing agent, which recently appeared in the market as top coat paints for motor vehicles to cope with acid precipitation, the following phenomena are occasionally observed.

In cured films of such new curing type paints, those blended polymer-derived defoamers remain as fine particles. In consequence, when water penetrates into the interfaces between the defoamer particles and the paint film, bubbles are formed in the defoamer particles to impart the paint film white, turbid appearance. This whitening phenomenon is apt to impair appearance of the paint finish. On the other hand, reduction in the blended amount of the defoamer to avoid deterioration in clarity of the paint film often results in unsatisfactory exhibition of the primary functions of the defoamer itself.

Accordingly, therefore, the object of the present invention is to provide novel defoamers for top coat paints for motor vehicles, in particular, such defoamers which do not cause whitening phenomenon and hence do not impair clarity of paint film, when they are blended in top coat paints for motor vehicles using no melamine resin as curing agent.

Means to Solve the Problem

According to our studies, the cause for the top coat paints adopting the new curing system to develop whitening in their painted films under the influence of warm water is as follows. In a paint to which a defoamer is added, the defoamer is dispersed in the cured paint film in the form of oil droplets. In case of baking finish paint, when its painted film is cooled to room temperature, i.e., a temperature lower than the glass transition point, after baking, negative internal stress is produced at the interfaces of the oil droplets, i.e., the defoamer particles, and the cured paint resin film, due to the difference in their coefficients of thermal expansion. When the painted film is immersed in warm water, water drops are formed at the interfaces of the defoamer oil droplets due to said negative internal stress, to relieve the stress. Where the painted film in which said water drops are formed is dried, at temperatures not lower than the glass transition point of the film which absorbed water, bubbles do not appear at the interfaces of the defoamer oil droplets and hence, no whitening phenomenon is developed, but at temperatures lower than the glass transition temperature, bubbles are formed and the whitening phenomenon takes place.

We have engaged in extensive studies to discover that a copolymer obtained by reacting (C) a polymerizable monomer or polymer used in conventional defoamers for paints with (A) a polymerizable monomer capable of forming a copolymer having isocyanate groups reactable with a binder resin in thermosetting paint or (B) a polymerizable monomer capable of forming a copolymer having groups which produce isocyanate groups reactable with a binder resin in thermosetting paint during the baking step of the same paint, can prevent whitening phenomenon without impairing the intended effects of the defoamers, and hence are useful as defoamers for, in particular, clear top coat paints for motor vehicles.

This discovery is based on a concept: since generally excessive hydroxyl groups are present in the occasion of curing reaction of glycidyl-containing acrylic resin/acid anhydride-curing type top coat paints for motor vehicles, it would be effective to introduce reactive isocyanate groups, which readily react with hydroxyl groups, into composition of defoamers, to decrease the interfaces of oil droplets of the defoamers.

Thus, according to the present invention, a defoamer for top coat paints for motor vehicles is provided, which is characterized by comprising a copolymer of 2-50% by weight of a polymerizable monomer (A) or (B) and 98-50% by weight of other monomer or polymer (C) which is reactable with said polymerizable monomer (A) or (B).

When the ratio of said polymerizable monomer (A) or (B) in the copolymer according to the invention is less than 2% by weight, the intended effect for preventing whitening phenomenon when it is incorporated in clear paints cannot be satisfactorily accomplished. On the other hand, when the ratio exceeds 50% by weight, the effects as a defoamer are not fully exhibited or paint film properties are adversely affected.

Examples of polymerizable monomer (A) include 2-isocyanatoethyl methacrylate, 2-isocyanatoethyl acrylate and 3-isopropenyl-α,α-dimethylbenzyl isocyanate.

Examples of polymerizable monomer (B) include monomers having a blocked isocyanate group, such as 2-(O-[1'-methylpropylideneamino]carboxyamino)ethyl methacrylate and 2-(O-[1'-methylpropylideneamino]carboxyamino)ethyl acrylate.

Examples of monomer or polymer (C) which is reactable with said polymerizable monomer (A) or (B) include alkyl esters of acrylic acid such as 2-ethylhexyl acrylate, lauryl acrylate and octadecyl acrylate; alkyl esters of methacrylic acid such as 2-ethylhexyl methacrylate, lauryl methacrylate, hexadecyl methacrylate and octadecyl methacrylate; alkyl vinyl ethers such as ethyl vinyl ether, propyl vinyl ether, butyl vinyl ether, 2-ethylhexyl vinyl ether, lauryl vinyl ether and octadecyl vinyl ether; and polymers having reactive groups such as vinyl-containing polybutadine. Whereas, those useful as starting materials of defoamers are versatile besides the foregoing, all of which are utilizable so long as they are reactable with said polymerizable monomers (A) or (B).

Synthesis of a copolymer from the polymerizable monomer (A) or (B) and said polymerizable monomer or polymer (C) can be performed by radical polymerization process using peroxide or azo compound, cationic polymerization process using acid catalyst, or anionic polymerization process using alkali metal catalyst. The present invention concerns development of utility of the copolymers, and is in no way limited by their method of synthesis.

The defoamers according to the present invention are usable with particular effectiveness for baking finish clear paints for motor vehicles for which finished appearance is of predominant importance and resistance to whitening is very significant.

The defoamers according to the present invention can be added to paints either during the process of preparing, or after the preparation, of the paints.

The use rate of a defoamer according to the invention is dependent on various factors such as nature of the paint to which the defoamer is added, conditions of use of the paint and painting conditions of the paint, and hence it is not critical. Whereas, it is generally used within a range of 0.001 to 5.0%, preferably 0.01 to 2.0%, as converted to solid, based on the weight of the paint composition. It may be blended with paint in a greater amount than that of a conventional defoamers for paint, because it has less tendency to cause whitening phenomenon.

Effects of the Invention

The defoamer for paint according to the present invention is characterized by comprising a copolymer having isocyanate groups which are reactable with binder resin in thermosetting paint or a copolymer having groups which produce isocyanate groups which are reactable with binder resin in thermosetting paint during the paint's baking step, and it not only imparts defoaming property to painted film but also prevents the phenomenon of the painted film to become white and turbid, in particular, even in the presence of the defoamer particles in the cured paint film.

EXAMPLES

Hereinafter the invention is explained in further details, referring to Examples in which parts and percentages are by weight. Molecular weights were measured by gel permeation chromatography (GPC), and polystyrene-converted average molecular weight were determined.

Production Example 1 of a Defoamer

A 1000 ml-reaction vessel equipped with a stirrer, reflux condenser, dropping funnel, thermometer and gaseous nitrogen inlet port was charged with 100 parts of xylene, which was heated to 100° C. under introduction of gaseous nitrogen. Thereafter the following solution (a-1) was dropped into said xylene at a constant rate through the dropping funnel, consuming 90 minutes.

| Solution (a-1) | |
| --- | --- |
| Octadecyl methacrylate | 285 parts |
| 2-Isocyanatoethyl methacrylate | 15 parts |
| Xylene | 100 parts |
| t-Butylperoxy-2-ethyl hexanoate | 5 parts |

An hour after completion of the dropwise addition of the solution (a-1), 1.5 parts of t-butylperoxy-2-ethyl hexanoate was added to the reaction system which was allowed to react for subsequent 3 hours while its temperature was maintained at 100° C. After termination of the reaction, the solid content was adjusted to 30% using xylene, and a defoamer [DG-1] was obtained. So synthesized polymer had a weight-average molecular weight of 17,000.

Production Example 2 of a Defoamer

A defoamer was prepared in the identical manner with above Production Example 1, except that the solution (a-1) was replaced with the following solution (a-2).

| Solution (a-2) | |
| --- | --- |
| Hexadecyl methacrylate | 190 parts |
| Lauryl vinyl ether | 80 parts |
| 2-(O-[1'-methylpropylideneamino]-carboxyamino)ethyl methacrylate | 30 parts |
| Xylene | 100 parts |
| t-Butylperoxy-2-ethyl hexanoate | 6 parts |

After termination of the reaction, the solid content was adjusted to 30% with xylene, and a defoamer [DG-2] was obtained. So synthesized polymer had a weight-average molecular weight of 25,000.

Production Example 3 of a Defoamer

A defoamer was prepared in the identical manner with Production Example 1, except that the solution (a-1) was replaced with the following solution (a-3).

| Solution (a-3) | |
| --- | --- |
| Lauryl methacrylate | 155 parts |
| 2-(O-[1'-methylpropylideneamino]-carboxyamino)ethyl methacrylate | 145 parts |
| Xylene | 100 parts |
| t-Butylperoxy-2-ethyl hexanoate | 15 parts |

After termination of the reaction, the solid content was adjusted to 30% with xylene, and a defoamer [DG-3] was obtained. So synthesized polymer had a weight-average molecular weight of 23,000.

Production Example 4 of a Defoamer

A defoamer was prepared in the identical manner with Production Example 1, except that the solution (a-1) was replaced with the following solution (a-4).

| Solution (a-4) | |
| --- | --- |
| Lauryl acrylate | 105 parts |
| Octadecyl methacrylate | 120 parts |
| 2-(O-[1'-methylpropylideneamino]-carboxyamino)ethyl methacrylate | 75 parts |
| Xylene | 100 parts |
| t-Butylperoxy-2-ethyl hexanoate | 5 parts |

After termination of the reaction, the solid content was adjusted to 30% with xylene, and a defoamer [DG-4] was obtained. So synthesized polymer had a weight-average molecular weight of 45,000.

Production Example 5 of a Defoamer

Into a 1000 ml-reaction vessel equipped with a stirrer, reflux condenser, dropping funnel, thermometer and gaseous nitrogen inlet port, the following reaction solution (a-5) was introduced under gaseous nitrogen introduction, followed by 5 hours' reaction at 100° C.

| Reaction solution (a-5) | |
| --- | --- |
| NISSO-PB B-3000*[)] | 240 parts |
| 2-(O-[1'-methylpropylideneamino]-carboxyamino)ethyl methacrylate | 60 parts |
| Xylene | 300 parts |
| Azobisisobutyronitrile | 6 parts |

*[)]1,2-vinyl-containing butadiene homopolymer (NIPPON SODA CO. LTD.)

After termination of the reaction, the solid content was adjusted to 30% with xylene, and a defoamer [DG-5] was obtained. So synthesized polymer had a weight-average molecular weight of 9,000.

Comparative Production Example 1 of a Defoamer

A reaction vessel similar to the one used in Production Example 1 of the defoamer was charged with 100 parts of xylene, which was heated to 100° C. under introduction of gaseous nitrogen. Then the following solution (c-1) was added dropwise through the dropping funnel at a constant rate, consuming 90 minutes.

| Solution (c-1) | |
| --- | --- |
| Octadecyl methacrylate | 300 parts |
| Xylene | 100 parts |
| t-Butylperoxy-2-ethyl hexanoate | 5 parts |

An hour after completion of the dropwise addition of the solution (c-1), 1.5 parts of t-butylperoxy-2-ethyl hexanoate was added, and the system was allowed to react for subsequent 3 hours while maintaining the temperature of 100° C. After termination of the reaction, the solid content was adjusted to 30% with xylene, and a defoamer [DN-1] was obtained. So synthesized polymer had a weight-average molecular weight of 20,000.

Comparative Production Example 2 of a Defoamer

The reaction of preceding Comparative Production Example 1 was repeated except that the following solution (c-2) was used in place of the solution (c-1).

| Solution (c-2) | |
| --- | --- |
| Hexadecyl methacrylate | 210 parts |
| Lauryl vinyl ether | 90 parts |
| Xylene | 100 parts |
| t-Butylperoxy-2-ethyl hexanoate | 15 parts |

After termination of the reaction, the solid content was adjusted to 30% with xylene, to provide a defoamer [DN-2]. So synthesized polymer had a weight-average molecular weight of 30,000.

Comparative Production Example 3 of a Defoamer

The reaction of Production Example 1 of the defoamer was repeated, except that the 2-isocyanatoethyl methacrylate used in the solution (a-1) was replaced with 2-hydroxyethyl methacrylate (solution (c-3)).

| Solution (c-3) | |
| --- | --- |
| Octadecyl methacrylate | 285 parts |
| 2-Hydroxyethyl methacrylate | 15 parts |
| Xylene | 100 parts |
| t-Butylperoxy-2-ethyl hexanoate | 15 parts |

After termination of the reaction, the solid content was adjusted to 30% with xylene, to provide a defoamer [DN-3]. The synthesized polymer had a weight-average molecular weight of 24,000.

Comparative Production Example 4 of a Defoamer

The reaction of Production Example 1 of the defoamer was repeated, except that the following solution (c-4) was used in place of the solution (a-1).

| Solution (c-4) | |
| --- | --- |
| Octadecyl methacrylate | 295 parts |
| 2-Isocyanatoethyl methacrylate | 5 parts |

-continued

| Solution (c-4) | |
|---|---|
| Xylene | 100 parts |
| t-Butylperoxy-2-ethyl hexanoate | 15 parts |

An hour after completion of the dropwise addition of the solution (c-4), 1.5 parts of t-butylperoxy-2-ethyl hexanoate was added to the reaction system which was allowed to react for subsequent 3 hours while maintaining its temperature of 100° C. After termination of the reaction, the solid content was adjusted to 30% with xylene, to provide a defoamer [DN-4]. The synthesized polymer had a weight-average molecular weight of 19,000.

Comparative Production Example 5 of a Defoamer

The reaction of Production Example 1 of the defoamer was repeated, except that the following solution (c-5) was used in place of the solution (a-1).

| Solution (c-5) | |
|---|---|
| Octadecyl methacrylate | 140 parts |
| 2-(O-[1'-methylpropylideneamino]-carboxyamino)ethyl methacrylate | 160 parts |
| Xylene | 100 parts |
| t-Butylperoxy-2-ethyl hexanoate | 15 parts |

An hour after completion of the dropwise addition of the solution (c-5), 1.5 parts of t-butylperoxy-2-ethyl hexanoate was added to the reaction system which was allowed to react for subsequent 3 hours while maintaining its temperature of 100° C. After termination of the reaction, the solid content was adjusted to 30% with xylene, to provide a defoamer [DN-5]. The synthesized polymer had a weight-average molecular weight of 22,000.

Comparative Production Example 6 of a Defoamer

The reaction of Production Example 1 of the defoamer was repeated, except that the following solution (c-6) was used in place of the solution (a-1).

| Solution (c-6) | |
|---|---|
| Lauryl acrylate | 150 parts |
| Octadecyl methacrylate | 150 parts |
| Xylene | 100 parts |
| t-Butylperoxy-2-ethyl hexanoate | 5 parts |

An hour after completion of the dropwise addition of the solution (c-6), 1.5 parts of t-butylperoxy-2-ethyl hexanoate was added, and the system was allowed to react for subsequent 3 hours while maintaining the temperature of 100° C. After termination of the reaction, the solid content was adjusted to 30% with xylene, and a defoamer [DN-6] was obtained. So synthesized polymer had a weight-average molecular weight of 55,000.

Comparative Production Example 7 of a Defoamer

The reaction of Production Example 5 of the defoamer was repeated, except that the following solution (c-7) was used in place of the solution (a-5).

| Reaction solution (c-7) | |
|---|---|
| NISSO-PB B-3000 | 240 parts |
| 2-Hydroxyethyl methacrylate | 60 parts |
| Xylene | 300 parts |
| Azobisisobutyronitrile | 6 parts |

After termination of the reaction, the solid content was adjusted to 30% with xylene, to provide a defoamer [DN-7]. So synthesized polymer had a weight-average molecular weight of 9,500.

TABLE 1

Defoamers of Production Examples

| | Defoamer | Weight-average molecular weight | Non-volatile component (%) |
|---|---|---|---|
| Production Example 1 | DG-1 | 17000 | 30 |
| Production Example 2 | DG-2 | 25000 | 30 |
| Production Example 3 | DG-3 | 23000 | 30 |
| Production Example 4 | DG-4 | 45000 | 30 |
| Production Example 5 | DG-5 | 9000 | 30 |

TABLE 2

Defoamers of Comparative Production Examples

| | Defoamer | Weight-average molecular weight | Non-volatile component (%) |
|---|---|---|---|
| Comparative Production Example 1 | DN-1 | 20000 | 30 |
| Comparative Production Example 2 | DN-2 | 30000 | 30 |
| Comparative Production Example 3 | DN-3 | 24000 | 30 |
| Comparative Production Example 4 | DN-4 | 19000 | 30 |
| Comparative Production Example 5 | DN-5 | 22000 | 30 |
| Comparative Production Example 6 | DN-6 | 55000 | 30 |
| Comparative Production Example 7 | DN-7 | 9500 | 30 |

Example 1

Defoamers' Anti-Whitening Property or Whitening Resistance Test with Acid Anhydride-Curing Type Clear Paint The formulation as shown in Table 3 was for conducting the test with a blend of an acrylic resin/acid anhydride-curing type clear paint alone, to distinctly demonstrate the improvement in whitening phenomenon. The starting materials as shown in Table 3 were homogeneously mixed with a dissolver to form an acid anhydride-curing type clear paint. To the paint 1% by weight to the clear paint of each of those defoamers shown in Tables 1 and 2 was added and dispersed with said dissolver at 2,000 r.p.m. for 2 minutes. Each of thus formed paint formulations was applied onto a glass plate with a 150 μm-applicator for an anti-whitening property test, and cured by baking in a 200° C. oven for 30 minutes. These painted plates were cooled off to room temperature, immersed in 80° C. warm water for an hour, and the water was then allowed to cool off to 25° C. by standing. The painted plates were withdrawn from the water tank, and water drops on the paint film surfaces were wiped off with dry non-woven fabric, followed by 24 hours' drying at room temperature. The whitening condition of each paint film was visually observed.

The test results of the paint films were evaluated as follows. The anti-whitening property of the painted films formed on the glass plates was visually evaluated in five scales from "the best" (5) to the worst (1). The test results were as shown in Table 4.

TABLE 3

Acid Anhydride-Curing Type Clear Paint Formulation

| Starting material | Amount (parts) | Maker company |
| --- | --- | --- |
| Finedic A-207S*[1] (50% solution*[2]) | 68.4 | Dainippon Ink & Chemicals, Inc. |
| Dodecenylsuccinic acid anhydride (50% solution*[2]) | 31.6 | Wako Pure Chemical Industries, Ltd. |
| DMP-30 (2,4,6-tris-(dimethyl-aminomethyl)phenol) | 1.0 | Wako Pure Chemical Industries, Ltd. |

*[1] epoxy equivalent 490 g/eq.
*[2] diluting solvent: Solvesso #100/xylene/butyl cellosolve/n-butanol = 4/3/2/1

TABLE 4

Test Results

| Defoamer | Added amount (%) | Anti-whitening property |
| --- | --- | --- |
| Blank | — | 5 |
| DG-1 | 0.5 | 5 |
| DG-2 | 0.5 | 5 |
| DG-3 | 0.5 | 5 |
| DG-4 | 0.5 | 5 |
| DG-5 | 0.5 | 5 |
| DN-1 | 0.5 | 2 |
| DN-2 | 0.5 | 1 |
| DN-3 | 0.5 | 3 |
| DN-4 | 0.5 | 2 |
| DN-5 | 0.5 | 5 |
| DN-6 | 0.5 | 1 |
| DN-7 | 0.5 | 3 |

Incorporation of isocyanate-containing monomers resulted in clear improvement in whitening phenomenon.

Example 2

Defoaming Property Test with Melamine Resin-Curing Clear Paint

For the purpose of comparing performance of those defoamers according to the present invention with that of conventional defoamers, a defoaming property test was conducted with melamine resin-curing type clear paints. First, viscosity of those clear paints shown in Table 5 was adjusted with a diluting solvent to 25 seconds with Ford cup #4, and each of the clear paints was applied onto a tin plate with an air spray gun in such a manner that the dry paint film thickness varied from 20 μm to 100 μm. The painted film was allowed to stand for 3 minutes after the application, and then baked in a 160° C. oven for 20 minutes to be cured.

The test results of the paint films were evaluated as follows. The defoaming property was evaluated by measuring with a thickness gauge the thickness of the parts of the films at which foams (hereafter may be referred to as popping) appeared on the painted surface of said tin plate. Furthermore, the whole number of poppings was visually observed, and graded in five scales from "the best" (5) showing the least number of poppings to "the worst" (1) showing the greatest number of poppings. The test results were as shown in Table 6.

Also for referential purpose, a whitening phenomenon test using glass plates similar to Example 1 was conducted. The evaluation grade was "the best" (5) in all cases.

TABLE 5

Melamine Resin-Curing Type Clear Paint

| Starting material | Amount (parts) | Maker company |
| --- | --- | --- |
| Beckosol EZ-3530-80 | 57.9 | Dainippon Ink & Chemicals, Inc. |
| Super Beckamine L-116-70 | 28.4 | Dainippon Ink & Chemicals, Inc. |
| Diluting solvent*) | proper quantity | |

*) diluting solvent: Solvesso #100/xylene/butylcellosolve/n-butanol = 4/3/2/1

TABLE 6

Test Results of Example 2

| Defoamer | Added amount (%) | Anti-whitening property | Foamed film thickness (μm) | Number of foams |
| --- | --- | --- | --- | --- |
| Blank | — | 5 | 20 | 1 |
| DG-1 | 0.5 | 5 | 65 | 4 |
| DG-2 | 0.5 | 5 | 80 | 5 |
| DG-3 | 0.5 | 5 | 50 | 3 |
| DG-4 | 0.5 | 5 | 60 | 4 |
| DG-5 | 0.5 | 5 | 40 | 3 |
| DN-1 | 0.5 | 5 | 80 | 5 |
| DN-2 | 0.5 | 5 | 80 | 5 |
| DN-3 | 0.5 | 5 | 40 | 2 |
| DN-4 | 0.5 | 5 | 70 | 4 |
| DN-5 | 0.5 | 5 | 20 | 1 |
| DN-6 | 0.5 | 5 | 60 | 4 |
| DN-7 | 0.5 | 5 | 40 | 3 |

With the acryl/melamine type clear paint no whitening phenomenon was recognized. Introduction of a suitable amount of isocyanate groups did not seriously affect the defoaming effect.

Example 3

Anti-Whitening Property Test and Defoaming Property Test of the Defoamers with Acid Anhydride-Curing Type Clear Paint Compositions Using the baked finish acryl/acid anhydride-curing type clear paint compositions as identified in Table 3 and those of the formulae as specified in Table 7, anti-whitening property of their painted films was tested. The defoamers were also added to the melamine resin-curing type clear paint compositions as identified in Table 5, and their defoaming property was tested.

The formula of (7-5) in Table 7 is that of the clear top coat paint for motor vehicles as shown in an Example of JP Hei 6 (1994)-228503A. To this paint the defoamers of Tables 1 and 2 were added each in an amount of 0.5 wt % to the clear paint, followed by dispersing at 2,000 rpm for 2 minutes with a dissolver.

Each of so formed paints was applied on a glass plate with a 150 μm-applicator for an anti-whitening property test, and cured by baking in a 200° C. oven for 30 minutes. These painted plates were cooled off to room temperature, immersed in 80° C. warm water for an hour. The water was then allowed to cool off to 25° C. by standing. The painted plates were withdrawn from the water tank, and water drops on the paint film surfaces were wiped off with dry non-woven fabric, followed by 24 hours' drying at room temperature. The whitening condition of each paint film was visually observed.

The defoaming property test was conducted in the following manner. Viscosity of those clear paints was adjusted by diluting them with propylene glycol monomethyl ether acetate to 30 seconds with Ford cup #4, and each of the clear paints was applied onto a tin plate with an air spray gun in such a manner that the dry paint film thickness varied from 20 μm to 100 μm. The painted films were allowed to stand for 3 minutes after the application, and then baked in a 150° C. oven for 20 minutes to be cured.

The test results of the paint films were evaluated as follows. The anti-whitening property of the baked films formed on the glass plates was visually evaluated in five scales from "the best" (5) to the worst (1).

The defoaming property was evaluated by measuring with a thickness gauge the thickness of the parts of the films at which foams or popping appeared on the painted surface of said tin plate. Furthermore, the whole number of poppings was visually observed, and graded in five scales from "the best" (5) showing the least number of poppings to "the worst" (1) showing the greatest number of poppings. The test results were as shown in Table 8.

TABLE 7

Acid-Epoxy-Curing Type Acrylic Clear Paint Formulae 7-1 Polyester resin varnish formula (A)

|  | Parts by weight |
|---|---|
| Isophthalic acid | 215.8 |
| Adipic acid | 65.0 |
| 1,6-Hexanediol | 89.7 |
| Neopentylglycol | 98.2 |
| Trimethylolpropane | 65.0 |
| Cardura E*) | 54.0 |

Non-volatile component was adjusted to 60% with Solvesso #100/butyl cellosolve = 9/1.
*)manufactured by Japan Epoxy Resin Co.

7-2 Acrylic resin varnish formula (B)
(a polymer containing epoxy groups and acid anhydride)

| Monomeric Composition | Parts by weight |
|---|---|
| Styrene | 50 |
| Glycidyl methacrylate | 400 |
| 2-Hydroxyethyl methacrylate | 350 |
| 2-Ethylhexyl acrylate | 200 |

After synthesizing the acrylic resin varnish having a number-average molecular weight of 4,000, its non-volatile component was adjusted to 59% with butyl acetate.

7-3 Formula for carboxylic anhydride-containing polymer (C-I)

| Monomeric composition | Parts by weight |
|---|---|
| Styrene | 25 |
| n-Butyl acrylate | 21 |
| n-Butyl methacrylate | 95 |

TABLE 7-continued

Acid-Epoxy-Curing Type Acrylic Clear Paint Formulae

| 2-Ethylhexyl methacrylate | 34 |
| Itaconic anhydride | 50 |

After synthesizing the acrylic resin having a number-average molecular weight of 5,500, its non-volatile component was adjusted to 53% with propylene glycol monomethyl ether acetate.

7-4 Formula for half-esterified polymer (C-II)

|  | Parts by weight |
|---|---|
| Polymer C-I | 385.0 |
| Triethylamine | 1.35 |
| Butyl acetate | 35.0 |
| Methanol | 18.2 |

7-5 Formula for test clear paint

|  | Parts by weight |
|---|---|
| Polyester resin varnish (A) | 14.6 |
| Acrylic resin varnish (B) | 100.0 |
| Half-esterified polymer (C-II) | 130.0 |

TABLE 8

| Defoamer | Added amount (%) | Anti-whitening property | Foamed film thickness (μm) | Number of foams |
|---|---|---|---|---|
| Blank | — | 5 | 20 | 1 |
| DG-1 | 0.5 | 5 | 40 | 4 |
| DG-2 | 0.5 | 5 | 60 | 5 |
| DG-3 | 0.5 | 5 | 30 | 3 |
| DG-4 | 0.5 | 5 | 50 | 4 |
| DG-5 | 0.5 | 5 | 20 | 1 |
| DN-1 | 0.5 | 1 | 60 | 5 |
| DN-2 | 0.5 | 1 | 60 | 5 |
| DN-3 | 0.5 | 1 | 50 | 4 |
| DN-4 | 0.5 | 1 | 60 | 5 |
| DN-5 | 0.5 | 5 | 20 | 1 |
| DN-6 | 0.5 | 1 | 50 | 4 |
| DN-7 | 0.5 | 5 | 20 | 1 |

Incorporation of the isocyanate-containing monomers clearly improved whitening phenomenon.

The defoamers DN-5 and DN-7 did not exhibit whitening phenomenon in these paint systems, but also exhibited no defoaming effect.

The invention claimed is:

1. A method for imparting defoaming property to a baking finish type top coat paint containing an acid anhydride curing agent, a melamine resin curing agent or a glycidyl-containing acrylic resin/acid anhydride curing agent for motor vehicles, comprising the step of:
adding a copolymer of 2-50% by weight of (A) a polymerizable monomer capable of forming a copolymer having isocyanate groups which can react with a binder resin in thermosetting paint or (B) a polymerizable monomer capable of forming a copolymer having groups capable of producing isocyanate groups which can react with a binder resin in thermosetting paint during baking step of the same paint, and 98-50% by weight of (C) other monomer or polymer reactable with said polymerizable monomer (A) or (B) to the top coat paint.

2. The method according to claim 1, in which the polymerizable monomer (A) is 2-isocyanatoethyl methacrylate or 3-isopropenyl-α,α-dimethylbenzylisocyanate.

3. The method according to claim 1, in which the polymerizable monomer (B) is 2-(O-[1'-methylpropylideneamino]

carboxyamino)ethyl methacrylate or 2-(O-[1'-methylpropy-lideneamino]carboxyamino)ethyl acrylate.

4. A method for imparting defoaming property to a baking finish type top coat paint containing an acid anhydride curing agent, a melamine resin curing agent or a glycidyl-containing acrylic resin/acid anhydride curing agent for motor vehicles, comprising the step of:
- adding a copolymer of 2-50% by weight of (A) a polymerizable monomer capable of forming a copolymer having isocyanate groups which can react with a binder resin in thermosetting paint or (B) a polymerizable monomer capable of forming a copolymer having such groups capable of producing isocyanate groups which can react with a binder resin in thermosetting paint during baking step of the same paint, and 98-50% by weight of (C) other monomer or polymer reactable with said polymerizable monomer (A) or (B) to the top coat paint,
- in which said other monomer or polymer (C) is alkyl acrylate, alkyl methacrylate, alkyl vinyl ether, or a polymer having reactive groups wherein said polymer having reactive groups is a vinyl-containing polybutadiene.

5. A baking finish type top coat paint containing an acid anhydride curing agent, a melamine resin curing agent or a glycidyl-containing acrylic resin/acid anhydride curing agent for motor vehicles, said top coat paint characterized in that said top coat paint comprises a defoamer which has been added as an additive to said top coat paint, said defoamer comprising a copolymer of 2-50% by weight of (A) a polymerizable monomer capable of forming a copolymer having isocyanate groups which can react with a binder resin in thermosetting paint or (B) a polymerizable monomer capable of forming a copolymer having groups capable of producing isocyanate groups which can react with a binder resin in thermosetting paint during baking step of the same paint, and 98-50% by weight of (C) other monomer or polymer reactable with said polymerizable monomer (A) or (B).

6. The top coat paint of claim 5, in which the polymerizable monomer (A) is 2-isocyanatoethyl methacrylate or 3-isopropenyl-α,α-dimethylbenzylisocyanate.

7. The top coat paint of claim 5, in which the polymerizable monomer (B) is 2-(O[1'-methylpropylideneamino]carboxyamino)ethyl methacrylate or 2-(O-[1'-methylpropylideneamino]carboxyamino)ethyl acrylate.

8. A baking finish type top coat paint containing an acid anhydride curing agent, a melamine resin curing agent or a glycidyl-containing acrylic resin/acid anhydride curing agent for motor vehicles, said top coat paint characterized in that said top coat paint comprises a defoamer which has been added as an additive to said top coat paint, said defoamer comprising a copolymer of 2-50% by weight of (A) a polymerizable monomer capable of forming a copolymer having isocyanate groups which can react with a binder resin in thermosetting paint or (B) a polymerizable monomer capable of forming a copolymer having groups capable of producing isocyanate groups which can react with a binder resin in thermosetting paint during baking step of the same paint, and 98-50% by weight of (C) other monomer or polymer reactable with said polymerizable monomer (A) or (B),
- in which said other monomer or polymer (C) is alkyl acrylate, alkyl methacrylate, alkyl vinyl ether, or a polymer having reactive groups wherein said polymer having reactive groups is a vinyl-containing polybutadeine.

9. The top coat paint of claim 5, wherein said top coat paint is clear.

* * * * *